United States Patent [19]
Biller

[11] Patent Number: 6,099,040
[45] Date of Patent: Aug. 8, 2000

[54] ADJUSTMENT DEVICE FOR A DEFLECTION FITTING

[75] Inventor: Dieter Biller, Alfdorf-Brech, Germany

[73] Assignee: TRW Occupant Restraint Systems GmbH & Co. KG, Alfdorf, Germany

[21] Appl. No.: 09/271,659

[22] Filed: Mar. 17, 1999

[30] Foreign Application Priority Data

Mar. 20, 1998 [DE] Germany ............... 298 05 083 U

[51] Int. Cl.⁷ .................................................. B60R 22/20
[52] U.S. Cl. ............................ 280/801.2; 280/806
[58] Field of Search ............................ 280/801.2, 806

[56] References Cited

U.S. PATENT DOCUMENTS

| | | | |
|---|---|---|---|
| 4,652,012 | 3/1987 | Biller et al. ............ | 280/801.2 |
| 4,872,704 | 10/1989 | Biller et al. ............ | 280/801.2 |
| 5,230,534 | 7/1993 | Boumarafi et al. ........ | 280/801.2 |
| 5,366,243 | 11/1994 | Ray et al. .............. | 280/801.2 |
| 5,794,977 | 8/1998 | Frank .................. | 280/801.2 |

*Primary Examiner*—Kenneth R. Rice
*Attorney, Agent, or Firm*—Tarolli, Sundheim, Covell, Tummino & Szabo L.L.P.

[57] ABSTRACT

An adjustment device for a deflection fitting of a vehicle safety belt system comprises a vehicle-fixed rail having a base provided with detent means and at least one front part extending opposite the base. It further comprises a sliding carriage displaceable in the rail, the sliding carriage being provided for an attachment of the deflection fitting. It is further provided a manually releasable detent mechanism able to cooperate with the detent means and able to arrest the sliding carriage in the rail. The detent means each have at least one projecting detent tooth. The adjustment device still further comprises a locking element which is functionally independent of the detent mechanism and is mounted on the sliding carriage in such a manner that it is movable, by means of an acceleration acting on the sliding carriage in a specific direction, from a position of rest in which it does not engage on the rail, into a locking position in which it engages on the rail and secures the sliding carriage against a further movement in the specific direction. The locking element has a contact surface facing the base, a support surface facing the front part, and a central region. The contact surface, when the aid locking element is in the locking position, is situated at least partially in front of the support surface when viewed in the specific direction. The central region of the locking element is able to abut at one of the detent teeth.

3 Claims, 6 Drawing Sheets

ADJUSTMENT DEVICE FOR A DEFLECTION FITTING

FIELD OF THE INVENTION

The invention relates to an adjustment device for a deflection fitting of a vehicle safety belt system.

BACKGROUND OF THE INVENTION

A typical adjustment device comprises a vehicle-fixed rail which has a base provided with detent means and also has at least one front part lying opposite the base, a sliding carriage displaceable in the rail, which sliding carriage is provided for an attachment of the deflection fitting, a manually releasable detent mechanism which can cooperate with the detent means and can arrest the sliding carriage in the rail, and a locking element which is functionally independent of the detent mechanism and is mounted on the sliding carriage in such a manner that it is movable, by means of an acceleration acting on the sliding carriage in a specific direction, from a position of rest in which it does not engage on the rail into a locking position in which it engages on the rail and secures the sliding carriage from further movement in the specific direction.

Such an adjustment device, as is known from U.S. patent application Ser. No. 835,455 of Apr. 8, 1997, serves to adapt the run of the safety belt optimally to the size of the respective vehicle occupant. Problems in the use of such an adjustment device can occur when the detent mechanism, in the case of an accident, is situated between two detent means constructed as detent openings, the sliding carriage therefore not being correctly secured at a detent opening by means of the detent mechanism. This problem is further intensified if the safety belt system is provided with a belt tensioner which in the case of an accident draws the belt slack out from the safety belt system. The forces thereby acting on the deflection fitting can lead to the detent mechanism not engaging reliably into the next detent opening and therefore to the sliding carriage being moved downwards relative to the vehicle, whereby the action of the belt tensioner is impaired. To prevent the sliding carriage from slipping past the next detent opening, a locking element, constructed as a locking catch and functionally independent of the detent mechanism, is mounted on the sliding carriage in such a way that it is movable, by means of an acceleration acting on the sliding carriage and directed downwards relative to the vehicle, from a position of rest in which it does not engage on the rail into a locking position in which it engages on the rail and secures the sliding carriage. The locking catch locks the sliding carriage after a movement of a few millimeters so that almost no additional belt slack is produced if the detent mechanism does not engage into a detent opening correctly.

A disadvantage in this adjustment device is that a high expenditure is necessary with regard to the dimensioning of all the components in order to reliably ensure that the locking catch reliably locks the sliding carriage under the high stresses which occur, and that it does not slip in the rail. It must in fact be ensured that the locking catch is moved towards the rail such that solely by means of the inertia forces resulting from the acceleration of the sliding carriage, the engagement edge of the locking catch digs into the rail.

BRIEF DESCRIPTION OF THE INVENTION

The invention provides an adjustment device in which the sliding carriage is locked on the rail with greater reliability. An adjustment device for a deflection fitting of a vehicle safety belt system according to the invention comprises a vehicle-fixed rail having a base provided with detent means and at least one front part extending opposite the base. It further comprises a sliding carriage displaceable in the rail, the sliding carriage being provided for an attachment of the deflection fitting. It is further provided a manually releasable detent mechanism able to cooperate with the detent means and able to arrest the sliding carriage in the rail. The detent means each have at least one projecting detent tooth. The adjustment device still further comprises a locking element which is functionally independent of the detent mechanism and is mounted on the sliding carriage in such a manner that it is movable, by means of an acceleration acting on the sliding carriage in a specific direction, from a position of rest in which it does not engage on the rail, into a locking position in which it engages on the rail and secures the sliding carriage against a further movement in the specific direction. The locking element has a contact surface facing the base, a support surface facing the front part, and a central region. The contact surface, when the aid locking element is in the locking position, is situated at least partially in front of the support surface when viewed in the specific direction. The central region of the locking element is able to abut at one of the detent teeth.

This design is based on a form-fitting locking of the locking element by a detent tooth, which ensures that the sliding carriage is locked in the rail with a particularly high degree of reliability; by contrast, substantially a force-fit is necessary between the locking element and the rail in the conventional adjustment device mentioned above, in order to lock the sliding carriage. Furthermore, with this design, a particularly stable balance of the locking element is produced, which wedges in the rail with the contact surface and the supporting surface which are staggered with respect to each other in the specific direction.

Advantageous developments of the invention will be apparent from the sub-claims.

BRIEF DESCRIPTION OF THE DRAWINGS

The invention is described below with reference to a preferred embodiment which is illustrated in the drawing, in which.

DETAILED DESCRIPTION OF THE INVENTION

Figure 1:
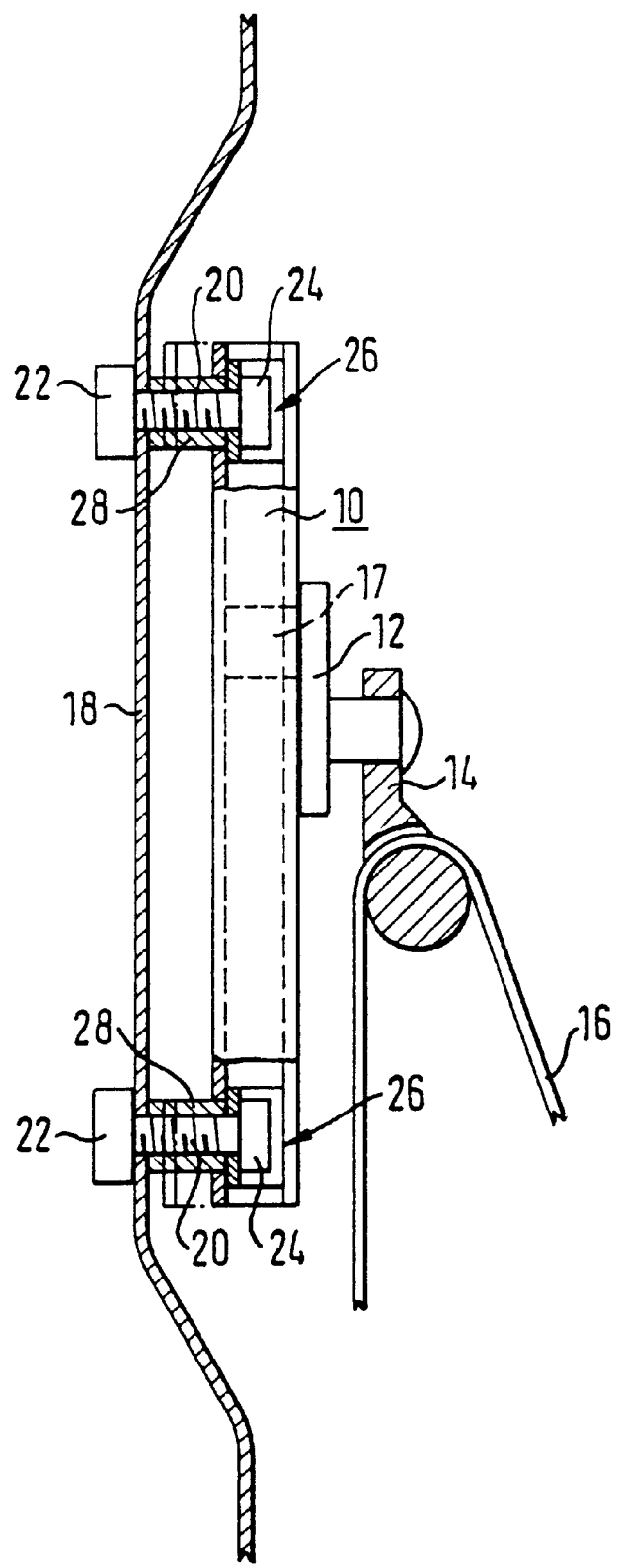
FIG. 1 shows a diagrammatic side view, partially in section, of an adjustment device.

In FIG. 1 a vertical adjuster according to the invention, with a rail 10 is illustrated, in which a sliding carriage 12 is displaceably arranged, to which a deflection fitting 14 for a vehicle safety belt 16 is attached. The sliding carriage 12 is provided with a detent mechanism 17 which can be manually actuated and by means of which the sliding carriage can be locked in desired positions in the rail. The rail 10 is secured to a body part 18 of the vehicle structure, for example a B-column of a vehicle. The rail is a hollow section which is open on the side facing away from the body part, so that access to the sliding carriage 12 is possible.

To secure the rail 10, a fastening screw 20 is used which is screwed into a counter-piece 22 on the body part 18. Between the head 24 of the screw 20 lying inside the rail 10 and the counter-piece 22, a spacer 26, 28 is arranged.

Figure 2:
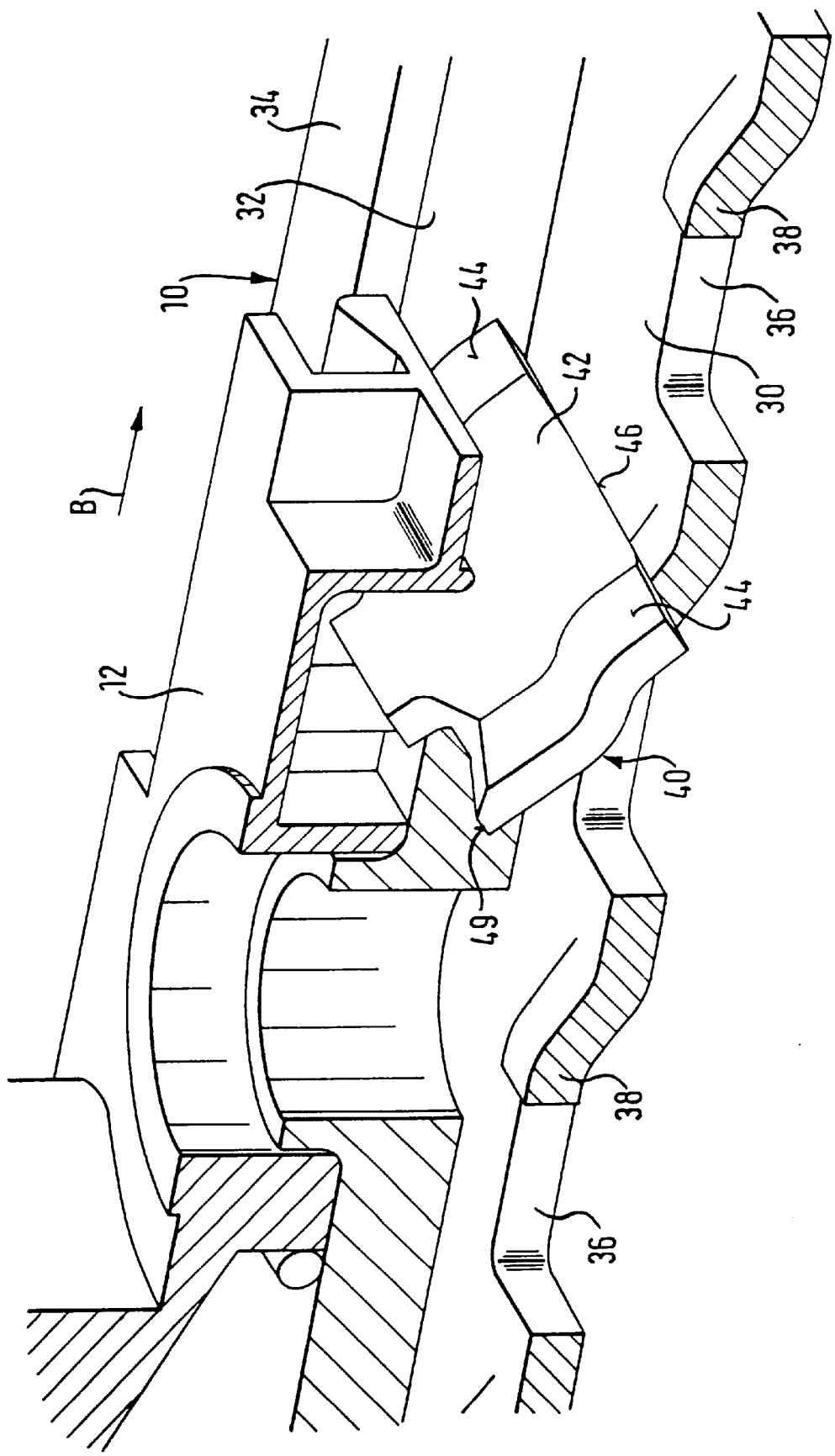
FIG. 2 shows a diagrammatic perspective view, partially in section, of a rail and of a sliding carriage displaceable therein, with the locking element in the position of rest.
Figure 6:
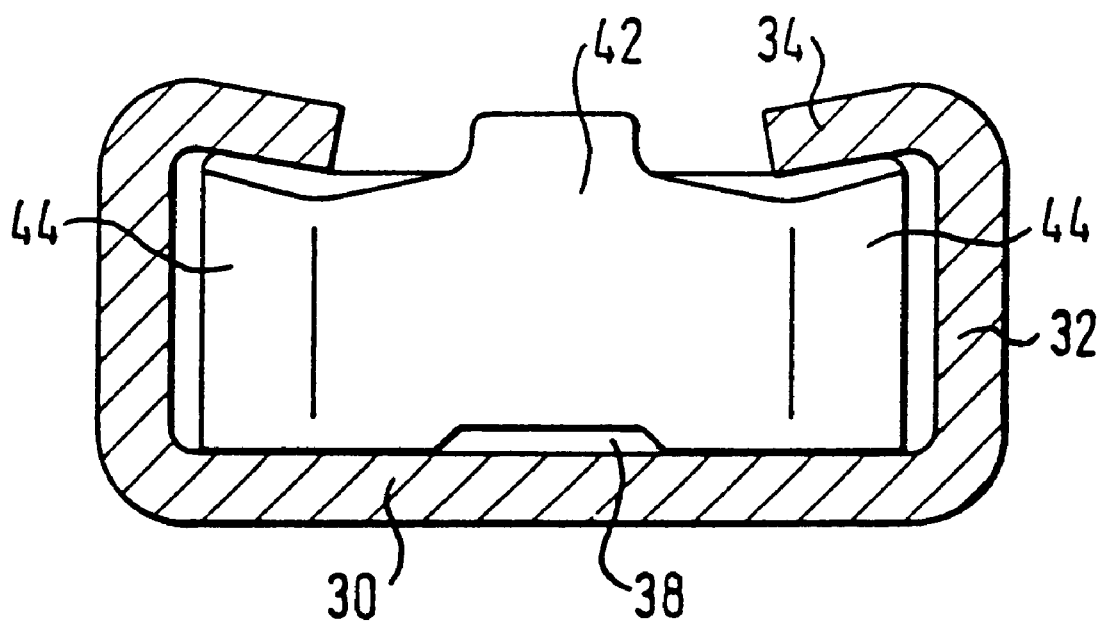
FIG. 6 shows a sectional view through the rail along the plane VI—VI of FIG. 4.

In FIG. 2, the rail 10 and the sliding carriage 12 can be seen in detail. The rail 10 has a base 30, two side pieces 32 and two front parts 34, only one of the side pieces and front parts being able to be seen in each case. The two front parts are inclined towards the interior of the rail (see FIG. 6).

Detent means are provided in the base 30 of the rail. These consist of several detent openings which are each delimited by an edge 36, and of several detent teeth 38 which are each constructed in the region of a detent opening. The detent teeth project into the interior of the rail 10, which is surrounded by the base, the side pieces and the front parts. The detent mechanism 17 can engage into the detent openings by a latch which is not illustrated in the figures.

A locking element 40 is arranged on the sliding carriage 12. The locking element is constructed in a plate form and has a flat central region 42 and a support region 44 each on each side thereof. Each supporting region has two sections which are staggered with respect to each other, the upper sections, facing the front parts, being situated approximately in the same plane as the central region, and the lower sections, facing the base, being situated relative to direction B (see arrow in FIG. 2), in which the sliding carriage is moved in the rail when a force is applied onto the deflection fitting 14 by the safety belt 16, in front of the plane which is defined by the central region 42. On the side facing the base 30, the locking element 40 has a flat contact surface 46 which extends from one of the supporting regions over the central region up to the other supporting region. Between the contact surface 46 and the side of the locking element 40 aligned contrary to direction B, a chamfer 48 is provided. Each supporting region is provided on its side opposite the contact surface 46 with a supporting surface 49 which is adapted to the inclination of the front parts 34 of the rail. The distance between the contact surface 46 and the supporting surface 49 of the locking element 40 is dimensioned such that the locking element 40 can be arranged in the interior of the rail and with a slight play perpendicular to it.

Figure 3:
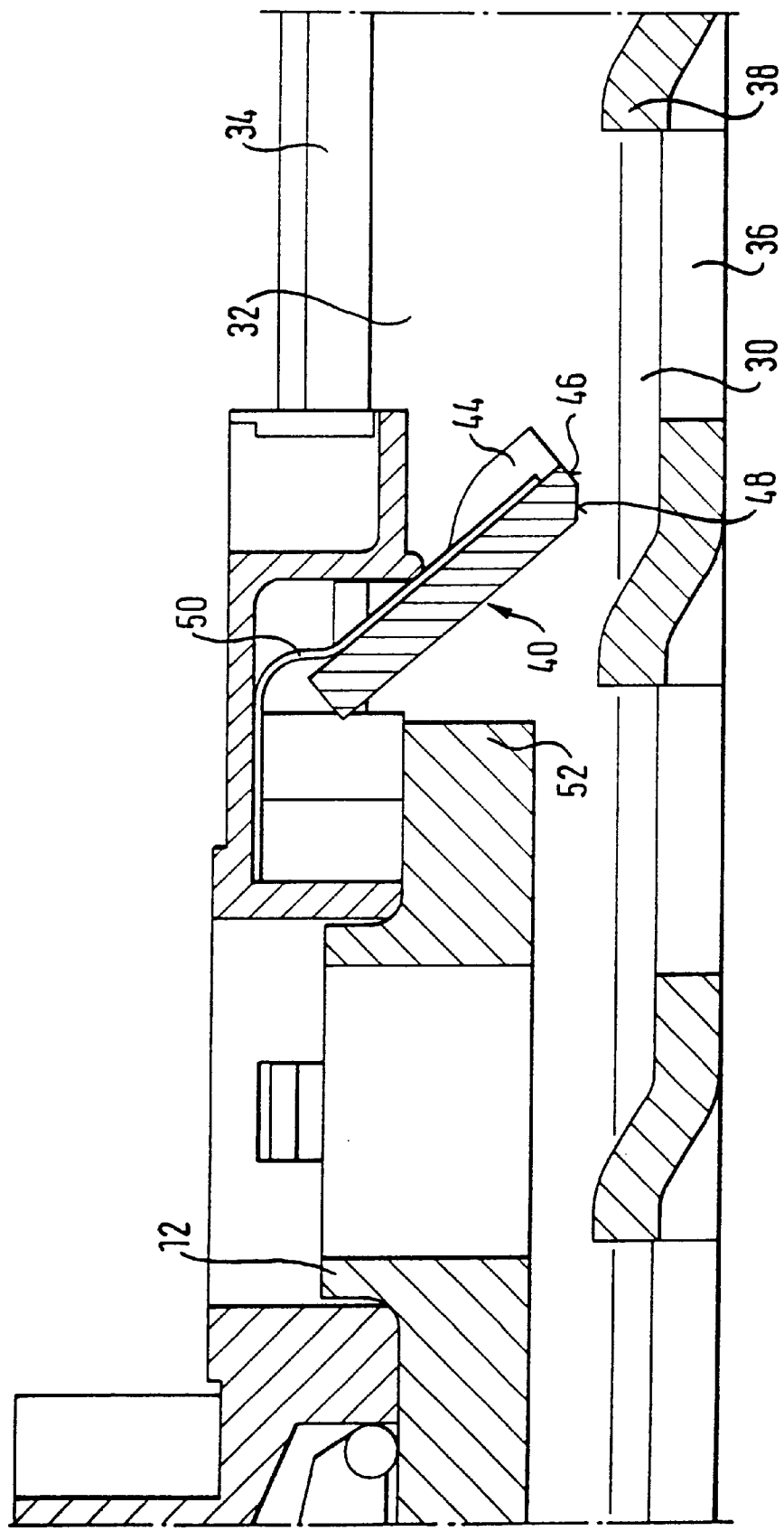
FIG. 3 shows a diagrammatic sectional view through the rail and the sliding carriage of FIG. 2.

The locking element 40 is arranged so as to be movable on the sliding carriage 12 by means of a plate spring 50 (see FIG. 3) and such that, when no external forces are acting, it is in the position of rest shown in FIGS. 2 and 3.

Figure 4:
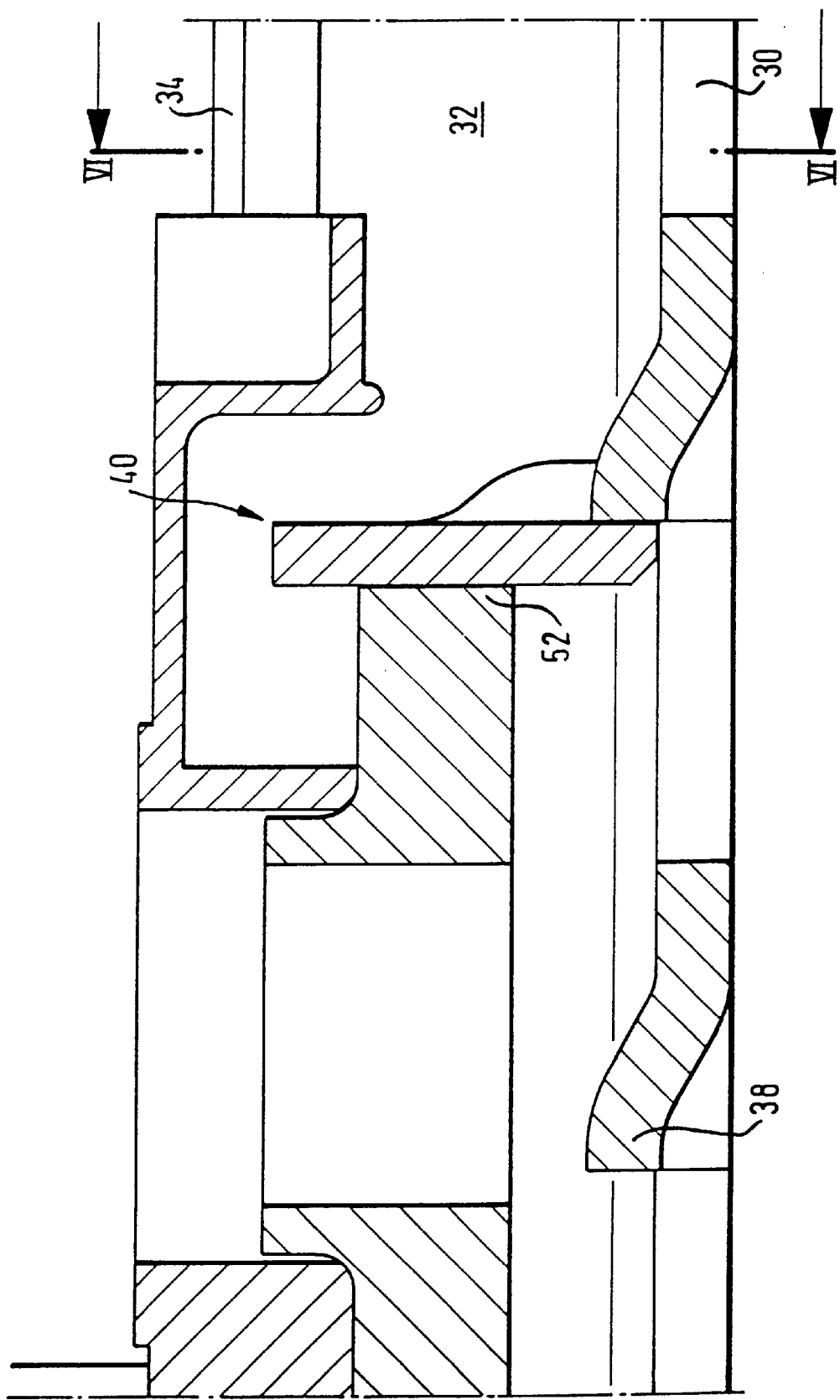
FIG. 4 shows a diagrammatic sectional view of a rail and of a sliding carriage with the locking element in the locking position.
Figure 5:
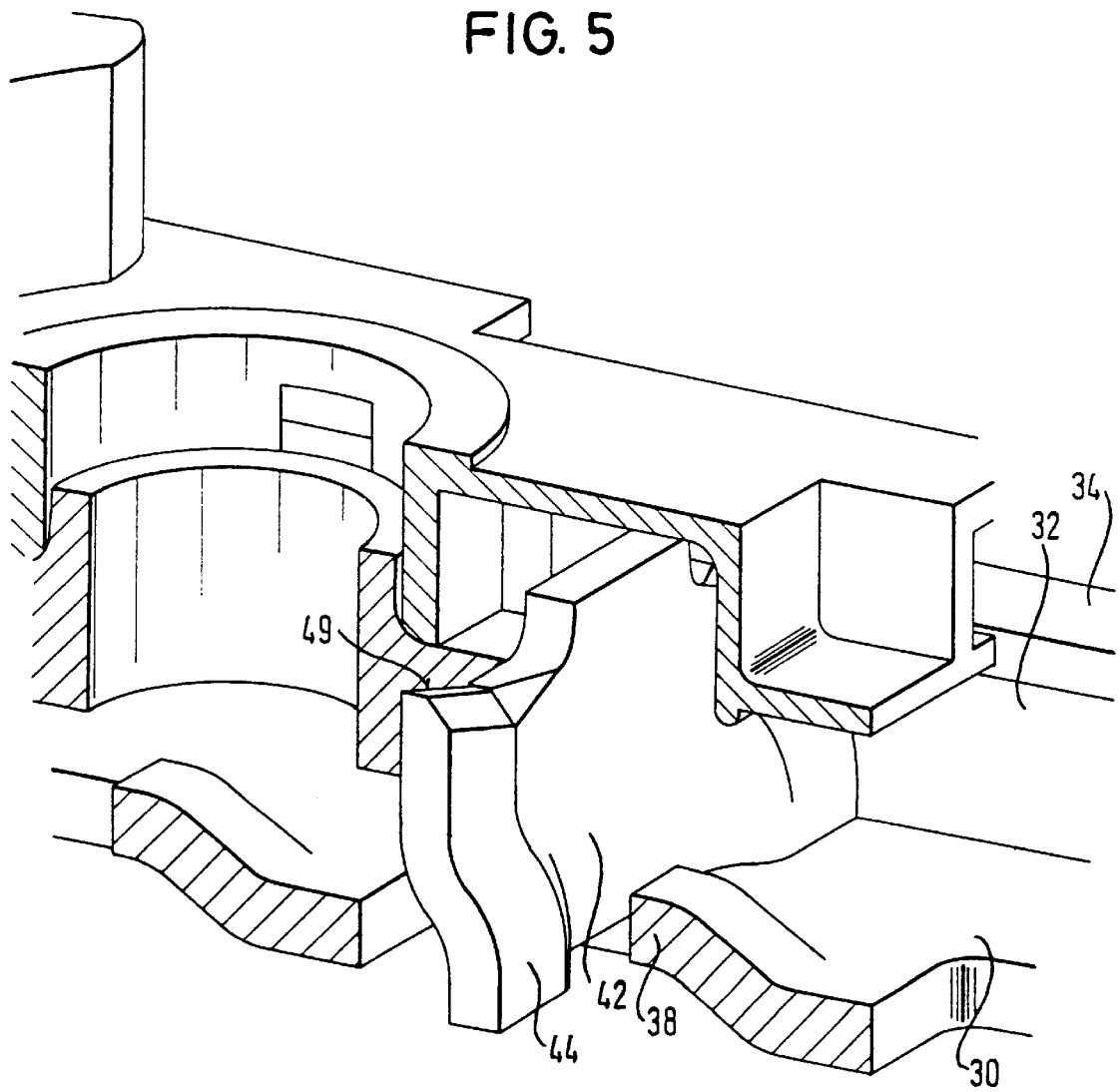
FIG. 5 shows a diagrammatic perspective view, partially in section, of the rail and of the sliding carriage of FIG. 4.

If a force acts on the deflection fitting in the direction of the arrow B, the sliding carriage, if it is not correctly locked in one of the detent openings, can be moved downwards in the rail. The result of this downward movement is an inertia force acting on the locking element, by means of which it is swung contrary to the action of the plate spring 50 out of the position of rest shown in FIGS. 2 and 3 into the locking position shown in FIGS. 4, 5 and 6, in which it is situated approximately perpendicularly to a plane defined by the base of the rail.

In the locking position, the contact surface 46 of the locking element 40 lies against the base of the rail 10. The central region 42 abuts with its face oriented in the direction of the arrow B at a detent tooth 38. The support surfaces 49 lie opposite the inner faces of the front parts or against them. In this state, the locking element is held stable, locking the sliding carriage securely and reliably against a movement in the direction of arrow B. It is pointed out in particular that the expenditure for mounting the locking element is low, although high stresses can be taken up. The locking element in fact does not have to be supported by the sliding carriage against a tilting movement; it is sufficient to provide a flat holding surface 52 against which the central region lies with its face aligned contrary to the direction B.

If a force is exerted by the holding surface 52 onto the locking element 40, the locking element is pressed with its central region 42 against a detent tooth 38. This results in a tilting moment which attempts to tilt the locking element 40 over the edge of the contact surface lying, as viewed in direction B, in front in the region of the support regions 44. As the sections of the support regions facing the base are staggered in the specific direction with respect to the sections of the support regions facing the front parts, the support surfaces 49 of the locking element would be raised away from the base with this tilting movement. However, this is not possible because the support surfaces 49 lie against the inner face of the front parts of the rail. The locking element is therefore held in its locking position in a stable manner. As the front parts 34 of the rail are inclined inwards, the locking element is also held securely in its place in the case of high loads, if a slight widening of the rail occurs.

What is claimed is:

1. An adjustment device for a deflection fitting of a vehicle safety belt system, comprising a vehicle-fixed rail having a base provided with detent means and at least one front part extending opposite said base, a sliding carriage displaceable in said rail, said sliding carriage being provided for an attachment of said deflection fitting, a manually releasable detent mechanism able to cooperate with said detent means and able to arrest said sliding carriage in said rail, said detent means each having at least one projecting detent tooth, and further comprising a locking element which is functionally independent of said detent mechanism and is mounted on said sliding carriage in such a manner that it is movable, by means of an acceleration acting on said sliding carriage in a specific direction, from a position of rest in which it does not engage on said rail, into a locking position in which it engages on said rail and secures said sliding carriage against a further movement in said specific direction, said locking element having a contact surface facing said base, a support surface facing said front part, and a central region, said contact surface, when said locking element is in said locking position, being situated at least partially in front of said support surface when viewed in said specific direction, and said central region of said locking element being able to abut at one of said detent teeth.

2. The adjustment device of claim 1, wherein said central region of said locking element is constructed flat, a support region being situated on each side of said central region, said support surface being constructed at an end of said support region facing said front part and said contact surface being constructed at least partially at an end of said support region facing said base.

3. The adjustment device of claim 1, wherein said locking element is mounted on said sliding carriage by means of a plate spring.

* * * * *